Nov. 28, 1967    D. A. JONES    3,354,804
DEVELOPING CAMERA

Filed July 23, 1964    6 Sheets-Sheet 1

INVENTOR.
DERRICK A. JONES
BY
Carpenter, Abbott, Coulter & Kinney
ATTORNEYS

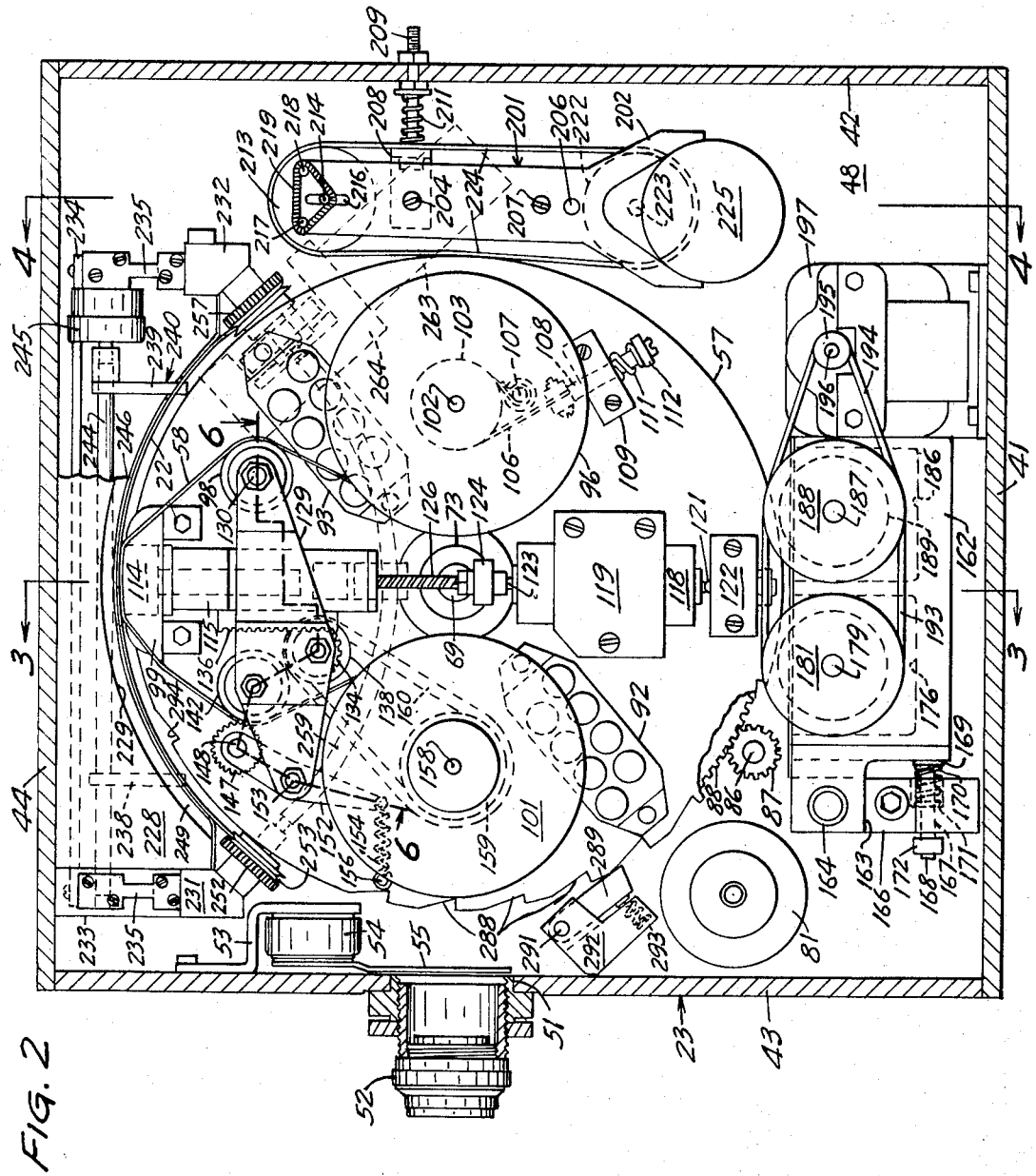

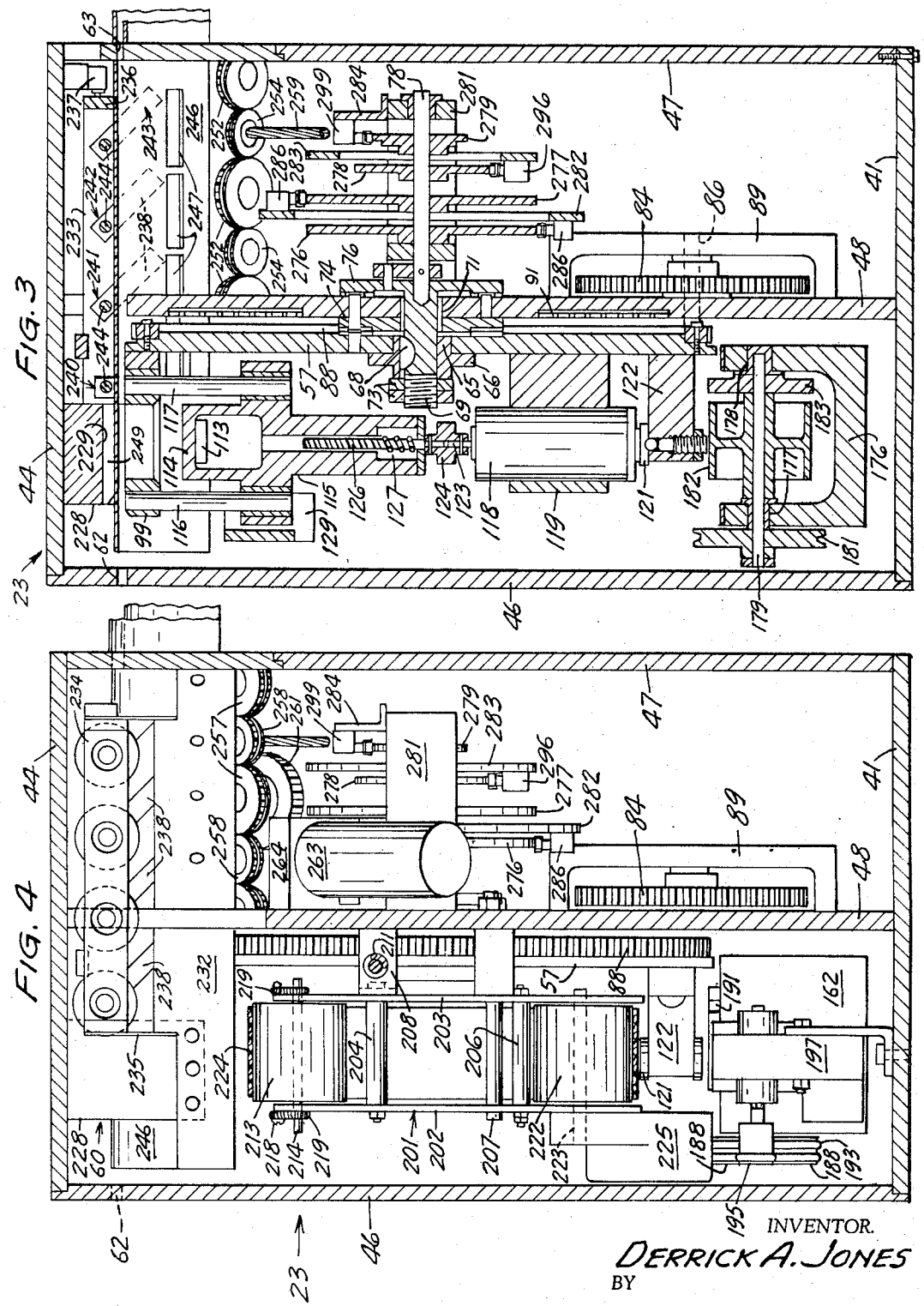

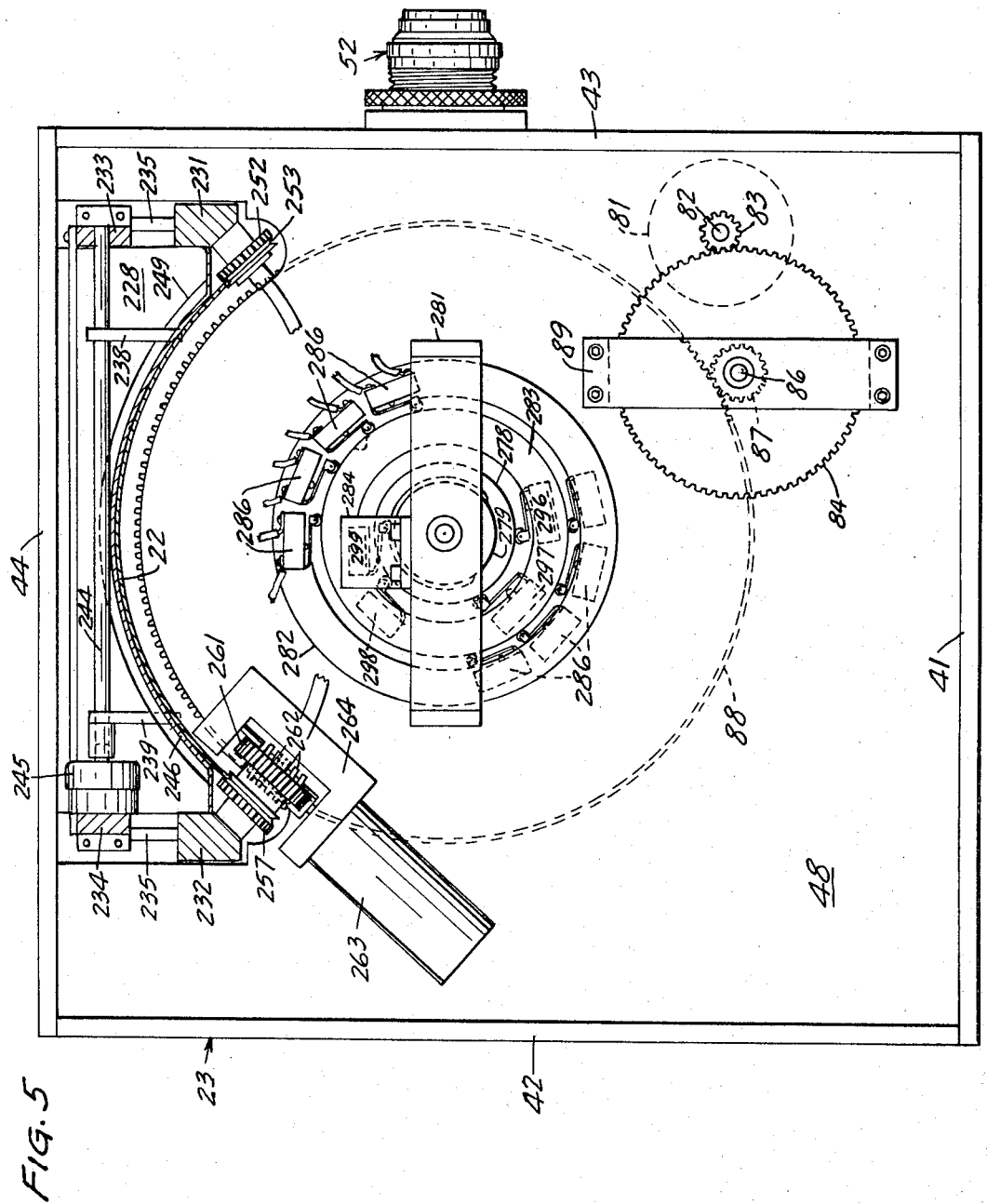

Nov. 28, 1967  D. A. JONES  3,354,804
DEVELOPING CAMERA
Filed July 23, 1964  6 Sheets-Sheet 5

INVENTOR.
DERRICK A. JONES
BY
Carpenter, Abbott, Coulter & Kinney
ATTORNEYS

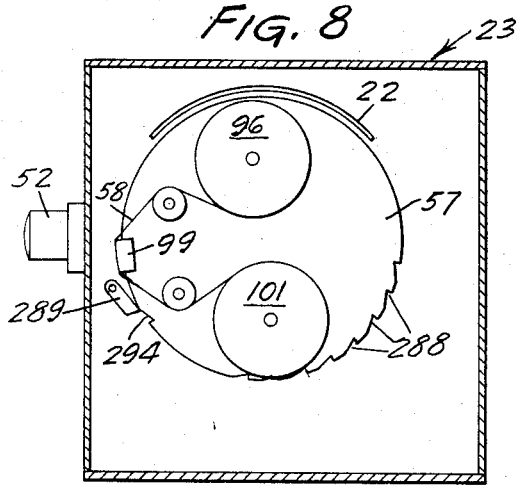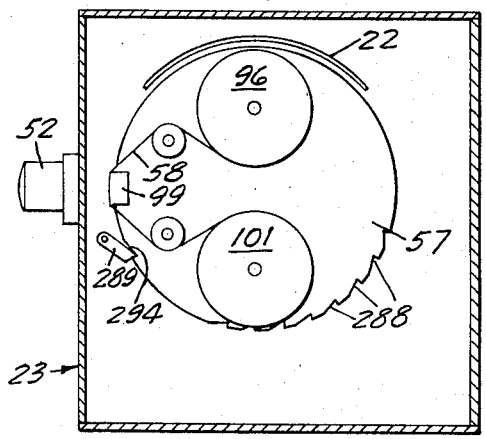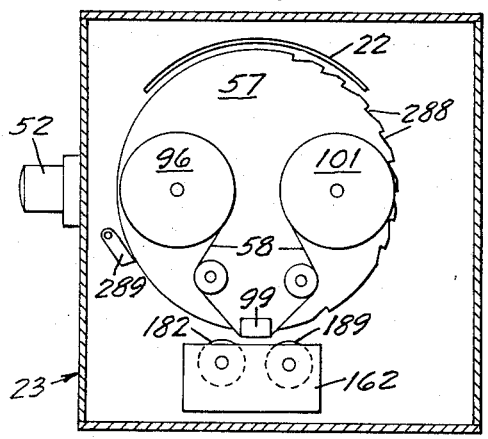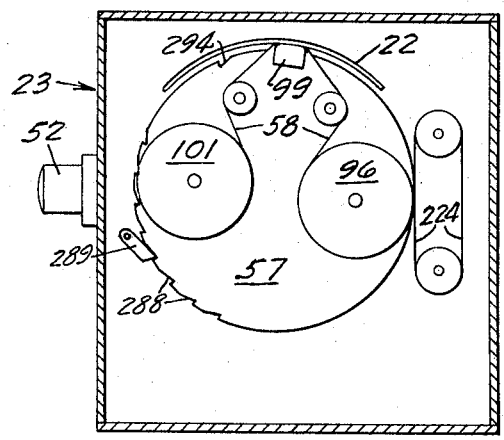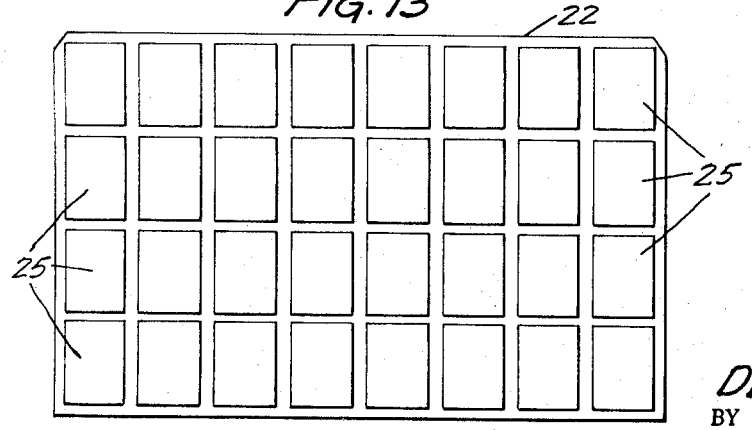

United States Patent Office 3,354,804
Patented Nov. 28, 1967

3,354,804
DEVELOPING CAMERA
Derrick A. Jones, Somerset Township, St. Croix County, Wis., assignor to Minnesota Mining and Manufacturing Company, St. Paul, Minn., a corporation of Delaware
Filed July 23, 1964, Ser. No. 384,748
11 Claims. (Cl. 95—14)

This invention relates to a photographic apparatus for the rapid production of visible permanent photographic copies by which nearly instant photographic microfilm size prints of original documents or other information may be obtained on a receptor sheet. The receptor sheet may then be used in an information storage and retrieval system when this photographic apparatus is a component of such system.

Photographically recording information and storing a photographic print instead of storing the original documents, which may be letters, articles, engineering drawings, or other photographs, has become a widely accepted and desired practice. It is somewhat difficult however to obtain an instant photographic copy of the original and have this copy on a receptor sheet which is adapted for use in an information storage and retrieval system. It is possible to very rapidly photograph documents and have the latent image present on a roll of microfilm which is later to be developed and stored for future use or which roll may later have the individual frames of the microfilm cut and mounted in a tabulating card of which there are several types commercially available. Additionally, it is presently possible to obtain a tabulating card with a developed photographic copy of an original mounted therein but even this method of photographically copying an original has not been accepted by everyone in the industry due to the cost involved in the card tabulating and sorting equipment. The need for an efficient and economical system of information storage has thus appeared and the present invention affords a material part to a novel system and affords means by which an original may be photographed and the photographic print may be rapidly developed for prompt storage in a storage system.

The photographic apparatus or camera of the present invention provides a very unique component in a novel information storage and retrieval system adapted for use with an information bearing receptor sheet or card. This receptor sheet is preferably a transparent, springy or stiffly resilient polymeric sheet adapted to receive photographic prints and thereafter adapted to be used as a transparency from which projected light images may be obtained for the reproduction of copies from said photographic prints.

This photographic apparatus uses a recently developed image reproduction process which comprises exposing a photoconductive, electrolytically developable copy sheet to produce a differential conductive pattern thereon, electrolytically forming a pattern of a vaporizable image forming substance on the exposed surface corresponding to said differentially conductive pattern, positioning said exposed surface of the copy sheet adjacent a receptor surface, and heating said copy sheet to effect the selective vapor transfer of said vaporizable image forming substance to said receptor surface and the formation on said receptor surface of a visible image corresponding to said differentially conductive pattern. This process is disclosed and described more fully in a copending United States patent application of Benjamin L. Shely and Joseph W. Shepard, Serial No. 181,796, filed March 22, 1962, and assigned to the assignee of the instant application.

The present invention provides a very compact camera for receiving a light image of an original and for developing a photographic print on a receptor sheet.

The present invention also provides a system whereby a photographic print of an original document may be obtained on a receptor sheet in a very short time.

The present invention additionally provides a novel sheet conveying and positioning apparatus which affords a great degree of control over the sheet.

A photographic apparatus formed in accordance with the present invention generally includes a casing, an aperture formed in the casing over which is placed a lens and shutter, a disk rotatably mounted within the casing and supporting an intermediate photosensitive film, developing apparatus positioned around the periphery of said disk, an opening formed in the casing for receiving a receptor sheet, means for supporting and transporting a said receptor sheet, and means for controlling the operation of said elements to impart an image to the receptor sheet.

These and other novel features of the present invention will become more apparent after reading the following detailed description which refers to the accompanying drawing wherein:

FIGURE 2 is a side elevational view of the camera of the system with the side plate broken away to show the parts disposed interiorly thereof;

FIGURE 3 is a transverse vertical section taken generally along the lines 3—3 of FIGURE 2;

FIGURE 4 is a vertical transverse sectional view taken generally along the lines 4—4 of FIGURE 2;

FIGURE 5 is a side elevational view of the opposite side of the camera with a side plate removed to show the portions interiorly thereof;

FIGURES 8, 9, 10 and 11 are schematic diagrams showing the cycle of the camera;

FIGURE 13 is a plan view of a receptor sheet used with the camera.

Figure 1:
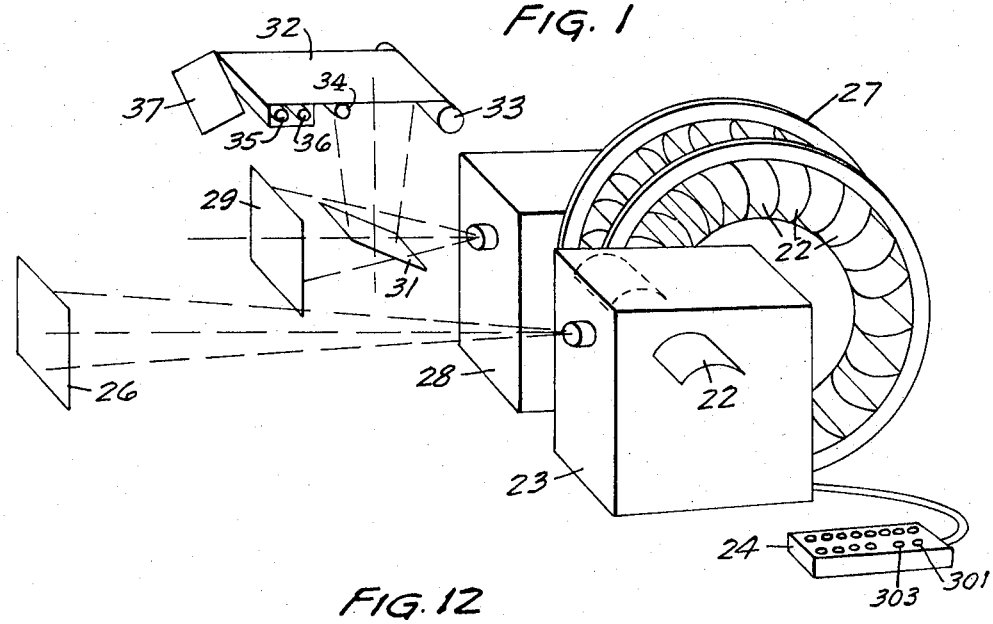
FIGURE 1 is a schematic perspective view of an information storing and retrieval system.
Figure 12:
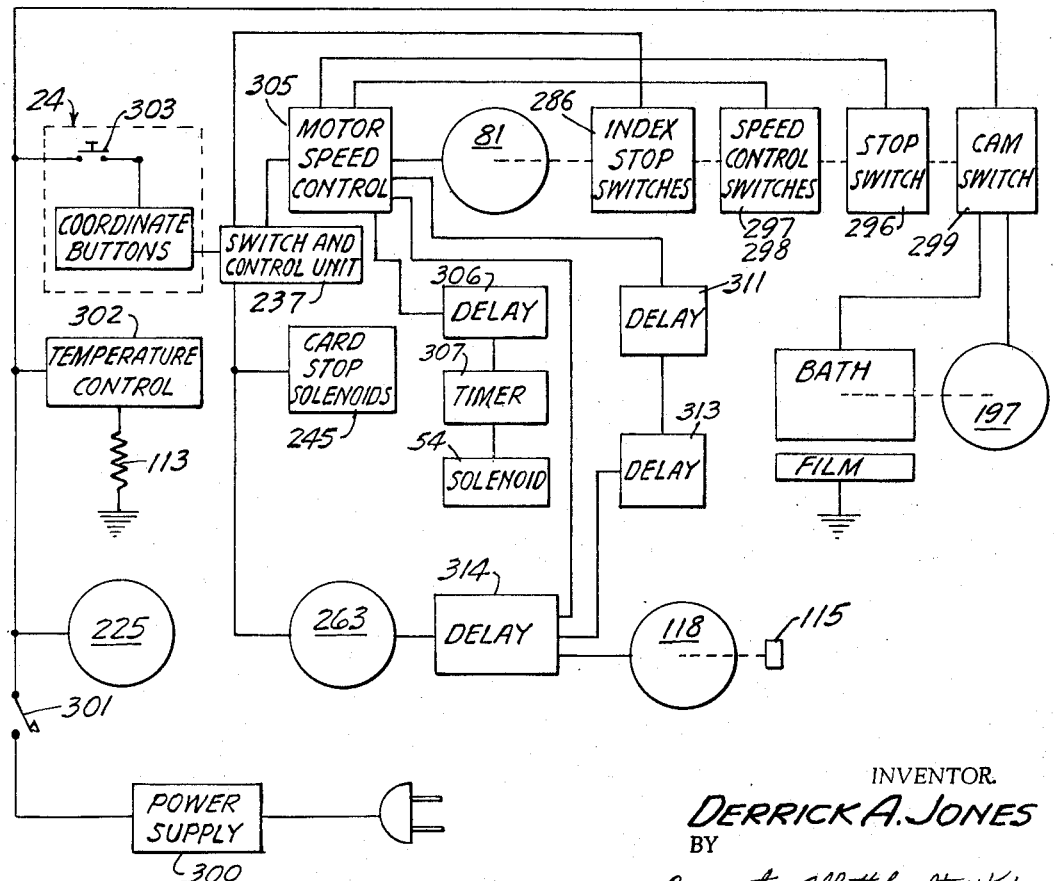
FIGURE 12 is a schematic view of the electrical control.

Referring now to FIGURE 1 of the drawing, there is illustrated therein an information storage and retrieval system. This system utilizes a card-like receptor sheet 22 upon which a plurality of photographic prints may be placed in a rectangular coordinate pattern (see FIGURE 13) and is movable through the equipment to receive a print, to be filed, to be retrieved and used as a transparency to make copies of the original. Throughout its operation and particularly in a photographic apparatus or camera 23 of the type described herein, the card 22 is maintained in an arcuate or bowed orientation. The camera 23 is adapted to receive the card 22 and convey the same to a selected predetermined position within the casing thereof as defined by operation of an electrical control unit 24. When inserted in the camera 23 a print is rapidly placed thereon, as shown in FIGURE 13 and designated by the numeral 25, of an original 26.

The card 22 may then be moved from the camera 23 into a storage magazine 27. This magazine 27 is adapted to store a plurality of such cards 22 and is provided with means for selectively positioning said magazine with respect to the camera 23 to receive a card.

Also incorporated in this information storage and retrieval system is the retrieval portion of the system which includes a projector apparatus 28 adapted to receive cards from the magazine 27 as selected. The projector 28 is adapted to project a light image onto a screen 29 such that an operator may read the information imparted to the uard 22. If the operator desires a physical print of the information, a mirror 31 is moved into the light path of the projected image and the light image is projected onto a copy paper 32 supported above the mirror 31. The copy paper 32 is stored on a supply roll 33 and supported between said supply roll 33 and a suitable drive roll 34. The projection of a light image onto the paper 32 renders the paper 32, in the illustrated embodiment, differentially electrically conductive in the image areas. This light struck area is then automatically conveyed over a pair of rollers 35 and 36 which are immersed in an electrolyte, and in the presence of an electrical potential a material from the electrolyte is deposited on the light struck image areas to produce a copy 37 of the original 26.

The camera 23 has a frame or casing formed by a base plate 41, a rear panel 42, a front panel 43, a top or cover plate 44, and side plates 46 and 47. The casing defines an enclosure which is divided longitudinally by a plate 48 extending between the rear panel 42 and front panel 43 substantially centrally of the enclosure to partition said enclosure. The plate or partition 48 is partially cut away at its upper edge but serves as a support member for a number of the elements of the camera.

An aperture 51 is formed in the front panel 43 and has a suitable lens, a lens barrel and supporting structure 52 mounted in said aperture and extending outwardly from the front panel. Within the enclosure a bracket 53 supports a rotary solenoid 54 which in turn has a blade 55 secured thereto. The blade is of a size sufficient to cover the aperture 51 and forms the shutter.

A suitable support member in the form of a disk 57 is disposed within the enclosure and is rotatably mounted on the partition 48. The disk 57 is adapted to support a strip of intermediate photosensitive material or film 58 in such a manner that one surface thereof may be disposed in alignment with the optical path of the lens for receiving an image thereon. This light image is then developed on the intermediate film as aforedescribed with a vaporizable material or substance and is then moved to a position adjacent the card 22. The developed image portion is brought into contact with a receptive surface of the card 22 and in the presence of heat a physical transfer of the deposited substance takes place to form an image on the card. The card 22 is advanced and supported in the casing by an apparatus, generally designated 60, after the card is placed in the casing. An aperture 62 is formed in the side plate 46 to receive the cards and after a print 25 has been placed on said card the apparatus 60 transports it through a similar aperture 63 formed in the side plate 47.

As best shown in FIGURE 3 the disk 57 has a central opening 65 formed therein and has a collar 66 secured thereto which fits into said opening. The collar 66 is formed with a keyway which receives a key 68 mounted in a shaft 69. The shaft 69 is journalled by a suitable bearing 71 in the partition 48. The disk 57 and collar 66 are suitably secured onto the shaft 69 by a pair of lock nuts 73 which are threadably received on the end of the shaft extending through said disk. Suitable spacer means such as washers 74 are provided between the partition 48 and the disk 57 to position the two members respectively. The shaft 69 has an enlarged flange 76 formed on the end thereof extending through the partition 48 and said flange is drivingly connected to a cam shaft 78 to be hereinafter described.

The disk 57 is rotatably driven by a variable speed reversible DC motor 81. The motor 81 is mounted on the partition 48 and has a drive shaft 82 which extends through the partition and has a gear wheel 83 secured thereto. The gear 83 intermeshes with a reduction gear 84 mounted on a shaft 86. The shaft 86 is journalled in the partition 48 and in a U-shaped bracket 89 secured to the partition 48, as is best shown in FIGURES 3 and 5. The shaft 86 carries a pinion gear 87 engageable with a ring gear 88 secured to the inner face of the disk 57.

Electrical current for the elements of the present apparatus which are supported on the disk 57 is conducted thereto by means of conventional slip rings such as the slip rings 91 mounted on the face of the partition 48 adjacent the inner face of the disk 57 and by a pair of insulated brush holders 92 and 93 each of which contain a plurality of brushes and which are secured to the disk 57.

The exposed face of the disk 57 is adapted to support a supply reel 96 containing a supply of the intermediate film 58. The film 58 is drawn from the supply reel 96, over an insulated guide roller 98, to the outer planar surface of a focal plane block 99 and is then rewound on a take-up reel 101, also supported on the disk 57.

The supply reel 96 is adapted to be mounted on and drivingly connected to a shaft 102 which has a slightly enlarged hub portion 103 on the end adjacent the disk 57 and which is rotatably mounted with respect to the disk 57. One-way brake means are provided for the shaft 102 comprising a flexible band 106 which is fixed at one end by a pin 107 and which passes around a substantial portion of the peripheral surface of the hub 103 to a position where its opposite end is fixed to a rod 108. The rod 108 is slidably mounted in a bracket 109 mounted on the disk 57. Tension is applied to the band 106 by a spring 111 which is positioned between the bracket 109 and a nut 112 threadably received on the opposite end of the rod 108 to adjust the tension in the band 106 and to adjust the braking force applied to the supply reel 96.

The focal plane block 99 is mounted on the disk 57 adjacent the outer peripheral edge thereof. This focal plane block 99 is trapezoidal-shaped in the film path providing a smooth edge for guiding the film across its outermost surface. The block 99 is formed with a radially extending rectangular aperture through which is slidably mounted a platen 114. The platen 114 is provided with a heating element 113 to produce the heat used to effect the transfer of the image forming material from the intermediate film 58 to the card 22. The platen 114 is mounted on the outer end of a slide block 115 which is guided by two axially spaced pins 116 and 117 which are secured to and extend radially inward from the focal plane block 99. Radial movement of the slide block 115 and the platen 114 is provided by a reversible direct current motor 118 which is mounted in a suitable support bracket 119 on the disk 57. A thrust bearing 121 is provided at one end of the motor and is adjustably mounted within a support block 122. The drive shaft 123 for the motor 118 is secured by means of a drive collar 124 to a ball screw 126 which is drivingly connected through a cooperating sleeve 127 mounted centrally with respect to the block 115. Rotation of the motor 118 thus causes the block 115 to move radially with respect to the peripheral edge of the disk 57 to move the platen 114 radially outwardly of the focal plane block 99 and inwardly with respect thereto.

Figure 6:
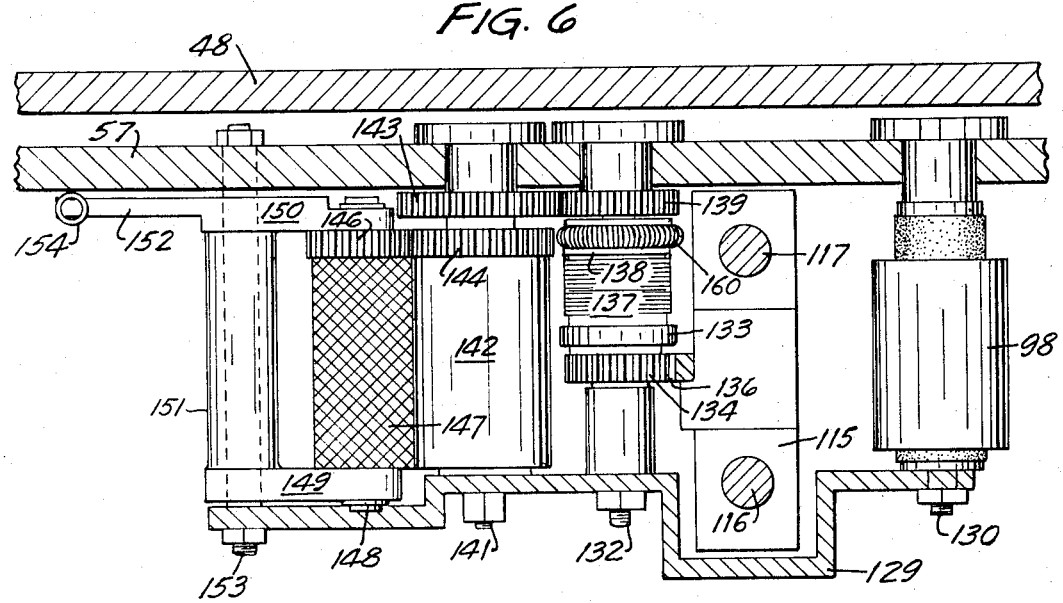
FIGURE 6 is a detail view taken generally along the line 6—6 of FIGURE 2.
Figure 7:
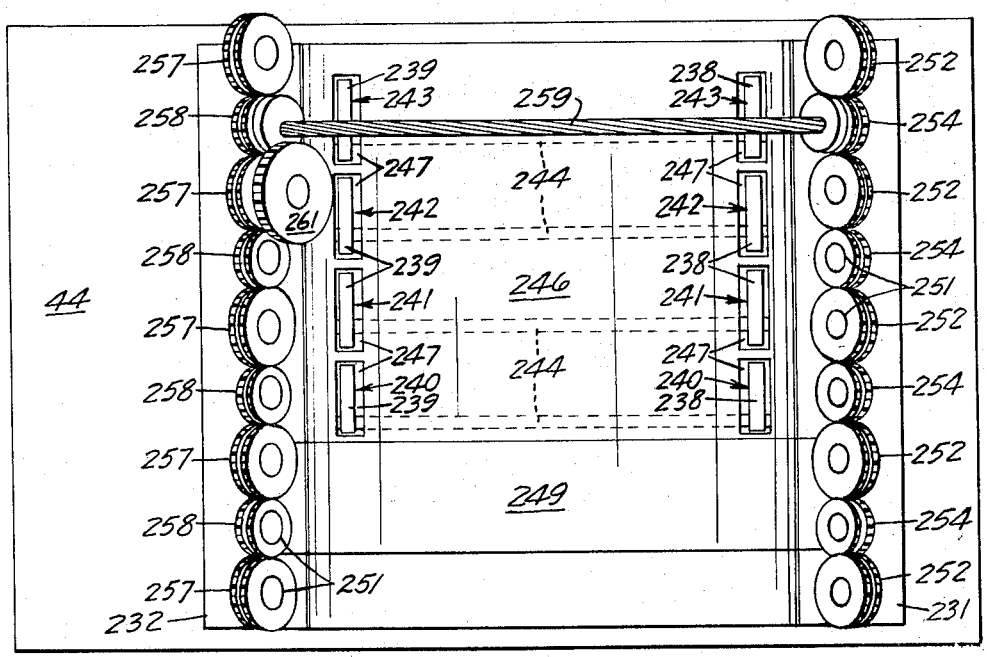
FIGURE 7 is a detail view of the receptor sheet conveying mechanism.

As shown in FIGURES 2 and 6, the guide roller 98 is supported between the disk 57 and a support plate 129. The guide roller 98 is freely rotatably mounted on a spacer pin 130 and is preferably formed of an insulating material or is formed with an insulating material on its outer peripheral surface.

The support plate 129 is additionally supported in spaced relation from the disk 57 by pins 132, 141 and 153. The pin 132, as best shown in FIGURE 6, supports a sleeve 133 formed with a pinion gear 134 which meshes with a rack 136 fixed to the block 115. Additionally mounted on the pin 132 is a one-way spring clutch 137 which serves to drive a pulley 138 and a drive gear 139 from the gear 134. Upon radial inward movement of the block 115 and platen 114 a driving force is transmitted by the rack 136 and gear 134 to drive the pulley 138 and gear 139 through a predetermined angular extent.

The third spacing rod 141 serves to journal a drive roller 142 which is formed with a high friction coating on its outer surface. Secured to the roller 142 and rotatable therewith is a driven gear 143 which meshes with the drive gear 139 to drive the roller 142 and a gear 144 which engages and drives another gear 146. The gear 146 is journaled on a dowel 148 together with a deeply knurled roller 147. The dowel 148 is carried between a pair of radially extending arms 149 and 150 which are fixed to a sleeve 151. The sleeve 151 is provided with a third radially extending arm 152 which is connected to one end of a tension spring 154. The tension spring 154 is fixed to the disk 57 by a pin 156 and serves to rotate the sleeve 151 about the spacer pin 153 to urge the knurled roller 147 and the gear 146 into pressure contacting driving engagement with the roller 142 and gear 144 respectively. The knurled roller 147 has a very coarse surface and serves as an electrical contact with the electrically conductive backing on the film 58 by penetrating the coating on the film. Alternative arrangements may be used however for making contact with the conductive backing.

The take-up reel 101 is driven and supported by a shaft 158 which is rotatably mounted on the disk 57 by suitable means and which has secured thereto, adjacent the disk 57, a drive pulley 159. The pulley 159 receives therearound an endless helical spring drive belt 160 which also passes around the drive pulley 138 on the spacing rod 132. The pulley 159 is substantially of larger diameter than the pulley 138 to over drive the shaft 158. The belt 160 can slip on the pulleys 159 and 138 but maintains a desired tension in the film between the drive roller 142 and the take-up reel at all times.

Means for developing the exposed film portion which is supported on the surface of the focal plane block 99 and platen 114 is provided and positioned in circumferential spaced relation around the edge of and axially offset from the disk 57 to be aligned with said focal plane block 99. The first element of this developing means is an apparatus for applying a meniscus of an electrolyte in contact with the exposed surface of the film 58 in the presence of an electrical potential and for washing the exposed surface by coating said surface with a thin film of water. The apparatus includes a swingably mounted double reservoir 162 which is pivotally mounted at one end thereof by having a pair of transversely spaced parallel arms 163 extending from said end and which receive therethrough a pivot pin 164. The pin 164 is supported intermediate its ends in a bracket 166 mounted in a cantilever fashion from the partition 48. An opening 167 is formed in the bracket 166 which loosely and, slidably receives a bolt 168 therein. At one end the bolt 168 is formed with an enlarged flat head 169 against which one end of a compression spring 170 bears, the other end of said spring engaging a shoulder 171 formed in the opening 167. A nut 172 formed on the other end of the bolt 168 prevents the bolt from passing through the opening 167. The compression spring 170 causes the reservoir 162 to pivot upwardly toward the disk 57 and the reservoir 162 is covered with a generally smooth upper friction free surface material such that when it engages the disk 57 to limit its upward swinging movement the amount of friction exerted against the disk is negligible.

A first tank 176 in the reservoir 162 contains an electrolyte and is formed with a pair of aligned openings in its opposed transverse wall which receives therein suitable liquid tight low friction bearings 177 and 178, see FIGURE 3. A shaft 179 is rotatably mounted in the bearings 177 and 178 and extends outwardly from the bearing 177 and has a pulley 181 fixed onto its extended end. Between the transversely spaced walls of the tank 176 and secured for rotation with the shaft 179 is a smooth surfaced metal roller 182 which has an axial length slightly less than the transverse dimension of the film 58. Also mounted on the shaft 179 between the transverse walls of the tank 176 is a cam follower roller 183 which is engageable with the outer peripheral surface of the focal plane block 99. This cam follower roller 183 has a slightly larger diameter than the roller 182 and thus determines the thickness of the coating of electrolyte which contacts the surface of the exposed film 58.

An electrical connection is made with the roller 182 to use said roller as an electrode and afford an electrical potential between the electrolyte and the conductive backing of the film 58.

The second tank 186 formed in the reservoir 162 journals a shaft 187 in much the same manner as provided and described for the shaft 179 except that the extended end of shaft 187 carries a double pulley 188 or a pulley formed with two belt receiving grooves in the rim thereof. The double pulley 188 and shaft 187 drive a coating roller 189 and cam follower roller 191 (see FIGURE 4) which are at least partially immersed in a wash solution, usually water contained in the tank 186. The wash solution is applied to the film 58 after being coated with the electrolyte.

A belt 193 passes around the pulley 181 on the shaft 179 and in one groove around the double pulley 188. A second belt 194 passes in the second groove around the double pulley 188 and around a drive pulley 195 secured to the drive shaft 196 of a constant speed motor 197 suitably mounted on the base plate 41.

Mounted in a vertical position with respect to the casing is a film drying apparatus which in the illustrated embodiment comprises a frame 201, formed of a pair of transversely spaced plates 202 and 203 separated by suitable rods 204 and 206, pivotally mounted with respect to the partition 48 by means of a stub shaft 207. An L-shaped bracket 208 is mounted on the plate 203. A bolt 209 suitably secured to the rear panel 42 has one end thereof slidably mounted through an opening in the foot of the L-shaped bracket 208 and has a compression spring 211 fitted thereon between the rear panel 42 and the foot of the bracket 208 to urge the upper ends of the plates 202 and 203 in a direction toward the disk 57. A roller 213 is rotatably mounted on a shaft 214 and is positioned between the plates 202 and 203 at the upper surface thereof. Aligned slots 216 formed in the upper ends of the plates 202 and 203 receive the opposed ends of the shaft 214. A pair of pins 217 and 218 secured at the upper ends of the plates 202 and 203 serve to support two continuous helical springs 219 which also pass beneath the ends of the shaft 214 thus urging the roller 213 toward an upper position with respect to the plates 202 and 203. A second roller 222 is mounted between the plates 202 and 203 on a driven shaft 223. An absorbent fibrous belt 224 passes around the rollers 213 and 222 and is adapted to remove any free liquid on the developed surface of the film 58 as the disk 57 rotates the film section in a counterclockwise direction past the belt as viewed in FIGURE 2. The spring 211 and springs 219 serve to place the belt 224 in position and under tension to afford the best drying conditions. The shaft 223 is driven from a constant speed motor 225 which is also provided with a gear drive train from the shaft of the motor to the shaft 223.

The card transport and positioning apparatus 60 is mounted vertically above the disk 57 and extends axially with respect thereto to drive the card 22 from the side plate 46 toward the side plate 47 and across the upper peripheral arcuate extent of the disk 57. For convenience, the card transport apparatus 60 is supported primarily from the cover plate 44 and comprises support means in the form of a frame which is secured to said cover plate. The frame includes a longitudinally extending bar 228 formed with a transversely extending arcuate lower surface portion 229. Secured to the bar 228 and extending transversely at the ends thereof are fixed frame members 231 and 232. Resiliently supported above said frame members 231 and 232 are support bars 233 and 234. The resilient mounting for the bars 233 and 234 is provided by links 235 which are formed of resilient material and are connected between each end of the bars 233 and 234 and shoulders formed on the frame members 231 and 232. A brace 236 (see FIGURE 3) joins the bars 233 and 234 and serves to actuate the plunger of an interlock switch 237, which is supported from the cover 44. The bars 233 and 234 also serve as support means for a plurality of card position stop means. In the illustrated embodiment there are four stop means 240, 241, 242 and 243, each of which are substantially identical and formed of a rod 244 which extends longitudinally between the bars 233 and 234 and have at one end thereof adjacent the bar 234 a rotary solenoid 245 which when energized, effects rotation of the rod 244 to swing a pair of radially extending stop members 238 and 239 from an inclined position to a vertical stop position. A spring (not shown) formed within the rotary solenoids 245 maintains the stop members in a normally inclined position.

An arcuately formed support and guide member 246 formed of sheet material is supported by the bar 228 and the transverse frame members 231 and 232. The guide member 246 extends transversely of the casing and axially with respect to the disk 57 and has the under surface thereof coated by a low friction material giving the arcuate sheet a low coefficient of friction permitting card 22 to move thereacross with little resistance. The guide member 246 is formed with a plurality of openings 247 through which may project the stop members 238 and 239 of each of the stop means to project said stop members selectively into the path of the card 22. The arcuate surface 229 of the bar 228 is covered by a pad 249 formed of an elastomeric material to define a resilient backing for the card 22 in the image transfer area which has a transverse dimension equal to that of the film 58 and has an arcuate extent equal to the length of a card 22.

The cards are moved across the undersurface of the guide member 246 by a suitable drive means which engages the opposed straight edges of a bowed card 22 when the same is disposed in its arcuate form. The drive means comprises a plurality of rollers or gear wheels positioned in two rows along the transverse members 231 and 232 such that their axes form planes which extend parallel to the axis of disk 57 and generally radial to the arcuate surface portion of the guide member 246

The gear wheels along the transverse member 231 are suitably mounted for rotation on bolts 251 and comprise a plurality of large diameter gear wheels 252 and smaller diameter gear wheels 254 arranged in an alternate fashion. The large diameter gear wheels 252 are formed with gear teeth around the outermost peripheral edge and are also formed with circumferential grooves 253 in the peripheral edge of the gear teeth forming a card receiving channel. A high friction material is disposed in the base of the groove of each of the gear wheels to engage the edge of the card 22 to impart linear transverse movement thereto. The small gear wheels 254 positioned intermediate the large gear wheels 252 serve to join the gear wheels 252 and transfer rotary motion therebetween. A similar set of large diameter gear wheels 257 are supported along the transverse frame member 232 and are separated by smaller gear wheels 258. The grooves in the gear wheels 257 form a card receiving channel generally facing the channel formed by the grooves 253 in the wheels 252. One of the small diameter gear wheels 258 is joined with one of the small diameter gear wheels 254 by means of a flexible torque transmitting cable 259. A large worm wheel 261 is mounted axially of and for rotation with one of the gear wheels 257. The worm wheel 261 is driven by a worm 262 carried on the drive shaft of a motor 263. The motor 263 is suitably mounted on a bracket 264 with the worm 262 disposed between portions of said bracket. Energization of the motor 263 affords uniform rotational movement for the gear wheels 252 and 257 such that a card having its opposed edges received in the channels defined by the grooves in said gear wheels will be moved transversely with respect to the casing of the camera 23. When a card is initially inserted it is moved along the guide member 246 until engaging the selected stop means 240, 241, 242 or 243. As the leading edge of a card strikes the stop members 238 and 239 the gear wheels 252 and 257 continue to move the card 22 and the stop members 238 and 239, together with the stop means support bars 233 and 234 against the bias of the resilient links 235 to close the switch 237. The switch 237 is preferably connected in the control circuit to provide a signal responsive to the card being located in position against the stop members 238 and 239 for permitting the camera 23 to carry out its automatic cycle.

The electromechanical control system provided for the camera 23 is such that when it is desired to impart a photographic print 25 of an original 26 to a card 22 the operator initially selects the coordinate position at which he wants to place the print on the card 22. This selection is made by depressing selected ones of the buttons on the control box 24. The row of four buttons on the control box control the card stop members and the row of eight buttons control the location at which the disk 57 will stop with respect to the pad 249 to transfer the image. After depressing selected coordinate position buttons, and inserting a card 22 in the apparatus 60, the operator presses the print button or operate switch 303 to energize the camera. From this point on, the camera functions automatically through a cycle to position the card, set the disk 57 at the exposure location, expose the intermediate film 58, develop the image thereon and impart the image to the card 22. The control system is regulated by a series of cams 276, 277, 278 and 279 which are mounted on the shaft 78 fixed for rotation with disk 57 as described hereinabove. A U-shaped bracket 281 supported by the partition 48 supports the outer end of the shaft 78 and additionally provides mounting means for switch supporting rings 282 and 283 and a switch mounting bracket 284. The ring 282 supports eight disk position control switches 286, four on the upper outer surface of the ring to engage the cam 277 and four on the lower inner surface of the ring to engage cam 276. The cams 276 and 277 each have a switch operating detent in the surface thereof and are mounted such that the cams alternately operate a switch 286 mounted on the ring 282. The eight switches 286 operate in conjunction with eight positions of the disk 57 and are connected in circuit with coordinate buttons on control box 24. A selected coordinate button and switch 286 causes the disk 57 to stop rotation after the actuation of such switch by either cam 276 or by cam 277 and then causes the motor to reverse. The position and registration of the disk 57 with respect to the card support is carefully determined by a mechanical stop. As shown in FIGURE 2 the quadrant of the disk 57 which is disposed on the lower left-hand side of the disk is formed with eight notches 288 corresponding to the eight coordinate positions for placing a photographic print on the card 22. After closure of one of the switches 286 the drive motor 81 reverses until a spring pressed pawl 289 engages in one of the notches 288 formed on the periphery of the disk 57. At such time the motor 81 will stall until it is de-energized. The pawl 289 is pivotally mounted on a pin 291 fixed in a bracket 292 which in turn is secured to the partition 48. A compression spring 293 forces the pawl into continuous engagement with the disk 57.

An additional notch 294 is formed in the disk 57, in the upper left-hand quadrant as shown in FIGURE 2, and determines the position of the disk with respect to the lens and lens barrel 52 to accurately align the focal plane block 99 and film 58 with respect thereto during the exposure step. A switch 296 which serves to control the position of disk 57 when in the exposure position or moving to the exposure position is supported on the switch ring 283 and is actuated by a detent in the cam 278.

The speed by which the disk 57 is rotated during the development step is varied and it is switched from a relatively fast speed to a slower mode by a switch 297 when the disk has rotated to a position with the focal plane block adjacent the reservoir 162 and a switch 298 causes the disk to increase its relative rotational speed after the focal plane block 99 passes the reservoir 162. The switches 297 and 298 are also supported on the switch ring 283 with switch 296 and are actuated by the detent of the cam 278.

The switch bracket 284 supports a single switch 299 which is actuated by the cam 279. The switch 299 is connected in circuit with the knurled feed roller 147 and with the electrolyte coating roller 182 and functions to afford an electrical potential between the electrolyte and the conductive backing on the film 58 during the time the disk 57 positions the focal plane block 99 and film 58 in the developing area. Switch 299 is also connected with the motor 197 to energize the same and rotate rollers 182 and 189.

*Operation*

Referring now to FIGURES 8, 9, 10, 11, and 12, the various steps during the operation of the camera 23 will be described together with an explanation of the electrical components of the control system. In operation an on-off switch 301 (FIGURE 12) must be thrown. This energizes a power supply 300 and energizes in turn the motor 225 on the film drying apparatus, a temperature control 302 and the heater 113, a circuit through switch 299 and a circuit to the operate switch 303. FIGURE 8 shows the camera in the stop or normally inoperative position. In this position the focal plane block 99 is disposed in a position just below and out of register with the optic axis of the lens and lens barrel 52. The operator will next select the coordinate position where the photographic print is to be applied to a card 22 by pressing a coordinate button of each row on the control box 24. The original is then put in position and a card 22 is inserted in the transport apparatus 60. The operator then presses the operate switch 303 of the momentary contact type. The operate switch 303 energizes the circuits for the card stop solenoids 245 and the card transport motor 263. The card 22 will then be transferred by rollers 252 and 257 until it strikes a set of the vertically positioned stop members 238 and 239. As the card is positioned by both of the stop members the switch 237 is closed. This will reduce the torque on the motor 263, energize the coordinate switches 286 and begin the automatic print cycle by energizing a disk motor control mechanism 305. The disk motor control mechanism 305 energizes the disk motor 81 and said motor operates to rotate the disk 57 clockwise from the position illustrated in FIGURE 8 to the position illustrated in FIGURE 9 bringing the notch 294 into engagement with the pawl 289. In this latter position the film 58 drawn across the focal plane block is ready to be exposed. A resistor-capacitor delay network 306 connected in circuit relation with the control mechanism 305 functions to operate said control mechanism, after a lapse of time sufficient for the notch 294 to engage the pawl and for the motor 81 to stall, to de-energize the motor and energize a shutter timer 307 and the shutter solenoid 54. The shutter timer 307 is set for the desired exposure period and then de-energizes the shutter solenoid 54 and a pulse is sent back to the disk motor control mechanism 305. The motor control 305 then re-energizes the disk motor 81 to rotate the disk 57 in a counterclockwise direction at a fairly fast speed toward the developing apparatus. As the focal plane block 99 on the disk 57 approaches the coating roller 182 in the electrolyte, switch 297 is operated by cam 278 resulting in a slowing down of the disk 57. In this position, switch 299 is operated to energize the motor 197 on the developing apparatus and to place an electrical potential between the roller 182 and the electrically conductive backing on the film 58. The disk motor 81 continues to rotate the disk 57 at the slower speed until the developing step illustrated in FIGURE 10, is finished and switch 298 is operated to cause the motor control 305 to increase its rotational speed. Disk 57 then rotates the developed film surface toward the position illustrated in FIGURE 11. As the disk is rotated the film surface passes the drying band 224 to remove the surplus fluid. When the preselected one of the coordinate position stop switches 286 carried on the switch ring 282 is operated the disk drive motor 81 is de-energized by the disk motor control mechanism 305 stopping the rotation of the disk and then the motor 81 is re-energized in the reverse direction. At the same time, a resistor-capacitor delay network 311 is pulsed upon the operation of the preselected coordinate stop switch 286 and network 311 serves to de-energize the motor 81 through the motor control mechanism 305, after the disk has been reversed and the pawl 289 engages the selected one of the notches 288 resulting in a stalling of said motor 81. The resistor-capacitor delay network 311, which de-energizes the motor 81, also energizes the platen operating motor 118. Operation of the motor 118 causes the guide block 115 and platen 114 to move the developed film 58 radially outwardly from its position in register with the focal plane block 99 to a position where the exposed and developed film portion will engage the card 22 which is backed by the pad 249. At this time the heater 113 disposed beneath the platen 114 causes a vaporization and transfer of the deposited vaporizable image forming substance to the card 22 which produces a photographic print 25 thereon. As the motor 118 was operated another resistor-capacitor delay network 313, in circuit relation with the motor 118, was energized. The delay network 313 times the interval the platen holds the film 58 against the face of the card. When the required delay time has expired the network 313 functions to reverse the motor 118 and energize a further resistor-capacitor delay network 314. The delay network 314 is effective to time the operation of the motor 118 in returning the platen to its inner position and at the same time advance the film 58 to position an unexposed portion thereof over the focal plane block 99 by operation of the rack 136, pinion gear 134 and rotation of the drive rollers 142 and 147. When the motor 118 has returned the platen 114, the disk motor control mechanism 305 is pulsed to re-energize the disk motor 81 and rotate the disk 57 in a counterclockwise direction until the focal plane block 99 reaches the position shown in FIGURE 8, at which time the switch 296 is operated causing a de-energization of the disk motor control mechanism 305 and in turn de-energization of the disk motor 81. The delay 314 is also effective to energize the card transport motor 263 and to de-energize the stop solenoids 245 such that the card 22 may be conveyed from the camera 23 as the disk 57 is returning to its normal "off" position.

While one embodiment of the invention has been illustrated and described it is apparent that certain modifications may be made without departing from the present invention. Additionally, the electrical control system may be varied without departing from the present invention as defined by the appended claims.

What is claimed is:

1. An apparatus for rapidly imparting microfilm size photographic prints onto a receptor sheet by the use of an intermediate photosensitive strip material, comprising a casing, a support member, means rotatably mounting said support member within said casing, means on said support member adapted for supporting a supply roll of a said strip material and a take-up spool for said strip material, means on said support member defining a strip supporting surface positioned between the supply roll and take-up spool adjacent an edge of said member, stationary means disposed adjacent said member for exposing a portion of a said strip material disposed on said strip supporting surface to impart an image thereto, stationary means for electrographically coating the exposed portion of strip material with an image-forming substance for developing said image, means for stationarily positioning said strip supporting surface in alignment with said exposure means and for rotating said support member and said supporting surface past said coating means, and means for supporting a said receptor sheet in a position spaced from said coating means and adjacent said edge of said support member and for bringing a said sheet and strip material into contact for the transfer of the developed image from a said strip material to a said receptor sheet.

2. An apparatus for placing an image of an original onto a bowed transparent resilient card comprising a casing defining an enclosure, a support member comprising a rotatably mounted disk having means thereon for supporting a supply roll of photosensitive strip material, a driven take-up spool, and a radially movable platen, the support for said radially movable platen defining a focal plane for a portion of said strip material and to position said portion adjacent the peripheral edge of said disk; means permitting the brief exposure of said strip material to a light image when said disk is in a first stationary position with said focal plane adjacent said exposure means, means for rotating said disk to afford movement of said material from said first position; means positioned below said disk for contacting the exposed strip material with an electrolyte to develop the latent image imparted to said material including means for supporting a supply of said electrolyte, means for applying an electrical potential between said electrolyte and said material to deposit a substance derived from said electrolyte on said surface; means positioned along said path and spaced from said development means for supporting and accurately positioning a said card; and means on said support member for moving said platen and the developed portion of said strip material toward said supporting and positioning means into contact with a said card to transfer said deposited substance to a said card..

3. An apparatus for rapidly and automatically recording a visible image of an original on a card-like receptor sheet adapted to receive a plurality of images thereon in a coordinate pattern comprising a casing defining an enclosure and having an aperture therein; means for projecting an image through said aperture; a disk rotatably mounted within said enclosure and having means thereon for supporting a supply roll of photosensitive strip material upon which a projected image may be received, means defining a focal plane near the periphery of said disk and for movably supporting a portion of a said strip material to move the same radially of said disk into contact with a said receptor sheet, and means for advancing a said strip material to place an unexposed portion over said means defining a focal plane after the placing of an image on a receptor sheet; means within said enclosure and adjacent the periphery of said disk for developing an image imparted to a said strip material by depositing a substance in the image area by electrolysis; means operative after the exposure of a said strip material for rotating said disk past said developing means to afford the development of an image and for stopping said disk in a desired one of several predetermined locations about the periphery of said disk and spaced from said developing means; conveying and positioning means placed adjacent the periphery of said disk for supporting a receptor sheet in an arcuate manner so one face thereof is closely adjacent the periphery of the disk, and control means for operating said means movably supporting a portion of a said strip material to move said portion into intimate pressure contact with the face of a said receptor sheet to effect the transfer of an image to a said receptor sheet.

4. An apparatus for rapidly and automatically recording a visible image of an original on a receptor sheet adapted to receive a plurality of images thereon in a coordinate pattern comprising a casing defining an enclosure and having an aperture therein covered by a lens and shutter, means for controlling said shutter, a disk disposed within said enclosure and rotatably mounted in relation to said casing, said disk having means for supporting a supply roll of photosensitive strip material upon which an image may be imparted upon operation of said shutter, a block mounted adjacent the periphery of said disk defining a focal plane over which a portion of said strip material is advanced, platen means movably mounted on said disk in relation to said block for moving a said portion of a said strip material radially of said disk into contact with a said receptor sheet, means for rewinding strip material which has been used from a said supply roll, and means for advancing a said strip material sequentially to place an unexposed portion over said block after the placing of an image on a receptor sheet, developing means spaced around the periphery of said disk for electrolytically depositing a substance on a said exposed portion of a said strip material to develop the image imparted thereto, means for rotating said disk upon operation of said shutter past said developing means to a location in opposed relation to a surface of a said receptor sheet, conveying and positioning means placed adjacent the periphery of said disk for supporting a said receptor sheet with a surface thereof being curved corresponding generally to the peripheral surface of said disk and for moving a said receptor sheet into and out of said casing by roller means engageable with opposite edges of a said sheet, and control means for automatically sequentially operating said conveying and positioning means, said shutter control means, said disk rotating means, said developing means, said platen means and said strip material advancing means to effect the recording of an image on a receptor sheet.

5. An apparatus for photographically copying an original and placing a reduced size image thereof onto a receptor sheet comprising a casing formed with an aperture and having a lens, a rotatable disk mounted within said casing, means for rotating said disk and for stopping the same at predetermined circumferential locations, support means on said disk for a supply of an intermediate strip material having a photosensitive surface and an electrically conductive backing, a shutter for said lens operative to expose a said strip material when said disk is stopped in a location associated with said lens, a coating roll rotatably driven and positioned adjacent the periphery of said disk in spaced relation to said lens, said roll affording means for coating a said exposed surface of a said sheet material with an electrolyte during rotation of said disk, means for placing an electrical potential between said roll and the conductive backing of a said sheet material during operation of said coating roll to deposit a substance derived from said electrolyte on said exposed surface, a second coating roll for contacting said exposed surface with a wash solution, drying means for removing excess electrolyte and wash solution adhering to said exposed surface during the continued rotation of said disk, a receptor sheet supporting and positioning apparatus including a resilient pad located adjacent the periphery of said disk for supporting and placing a surface portion of a receptor sheet in a predetermined axial location in relation to said disk, and arcuate heated platen means for carrying the developed and dried strip material outwardly of said support means to press said developed surface into intimate pressure contact with a said surface portion of a said receptor sheet in the presence of heat to transfer the deposited substance of the electrolyte from said strip material to a said receptor sheet to produce an image thereon.

6. An apparatus for placing an image of an original onto a card-like receptor sheet comprising a rotatably mounted disk for supporting thereon a photosensitive strip material, a portion of said strip material being positioned over a support fixed adjacent the periphery of said disk, reversible drive means engageable with the disk adjacent the edge thereof, a plurality of notches formed in said disk and spaced circumferentially about the edge thereof for positioning said disk in predetermined locations, a pawl biased toward said edge of said disk to engage in said notches and limit rotation of said disk when the same is rotated in a given direction, means permitting the brief exposure of said strip material to a light image when said disk is positioned at one of said locations, means positioned about the edge of said disk for the electrolytic development of the latent image imparted to said material including means for supporting a supply of an electrolyte, means for applying an electrical potential between said electrolyte and said surface to deposit a substance derived from said electrolyte on said surface, means for removing the excess electrolyte from said surface after said depositing, means for supporting a said receptor sheet with one face thereof positioned adjacent the edge of said disk and at one of said locations to afford the transfer of the deposit to said receptor sheet, and control means for operating said drive means through a cycle to locate said disk and to move said disk from a said location to another past said means for development and said means for removing to produce an image on said receptor sheet.

7. A camera for rapidly imparting a visible photographic image on a receptor sheet, comprising: a casing, lens and shutter means for projection of an image onto an intermediate photosensitive transfer film, a rotary support for a said intermediate transfer film, means for developing an image imparted to a portion of a said film, means for rotating said support from a first stationary position placing said film adjacent said lens and shutter means to said developing means and therepast to a second stationary position to transfer the developed image to a said receptor sheet, a sheet transport device for advancing a said receptor sheet in a bowed orientation, said device comprising two parallel rows of driven circumferentially grooved rollers, the axes of the rollers in each row being disposed in a common plane, the grooves of the two rows of rollers defining parallel separated channels generally facing each other for receiving the straight edges of a said bowed sheet, stop means including members movable into the path of a said sheet for stopping the advancement thereof, and means for moving the film carrying the developed image into contact with a said receptor sheet to transfer an image thereto.

8. A camera for rapidly imparting a visible photographic image on a receptor sheet, comprising: a casing, means for projecting a light image onto an intermediate photosensitive transfer film, a disk for supporting a supply of a said intermediate transfer film and for positioning a portion thereof on a plane to receive an image, means mounting said disk for rotation about an axis, means for developing an image imparted to a said portion of a said film, means for rotating said disk from a position placing said film adjacent said projecting means past said developing means to a position to transfer the developed image to a said receptor sheet, a sheet transport device for advancing a said receptor sheet in a bowed orientation with the bow conforming generally to the curvature of said disk, said device comprising two rows of driven circumferentially grooved rollers extending parallel with the axis of said disk, the axes of the rollers in each row being disposed in a common plane, the grooves of the two rows of rollers defining parallel separated channels generally facing each other for receiving the straight edges of a said bowed sheet, stop means including members movable into the path of a said sheet for stopping the advancement thereof, means responsive to the location of a said bowed sheet against the stop members permitting the operation of said means for rotating said disk, and arcuate platen means supported on said disk for moving the sheet material carrying the developed image from the plane to receive an image radially outward into contact with a said receptor sheet to transfer an image thereto.

9. An electrographic apparatus adapted to produce a copy of graphic intelligence, said apparatus comprising
(A) a movable support member,
  (1) storage means mounted on said support member and within the periphery thereof for storing a supply of strip material for reproducing thereon the graphic intelligence, and
  (2) peripheral means mounted on said support member defining an outer peripheral strip-supporting surface over which successive strip material passes as the same is moved from said means for storing said strip material,
(B) a stationary frame means,
  (1) imaging means on said frame means for imparting graphic intelligence onto strip material disposed on said peripheral strip-supporting surface of said peripheral means, and
  (2) electrographic means in juxtaposition with said imaging means for depositing a developer substance upon said strip material disposed on said strip-supporting surface of said peripheral means to develop such graphic intelligence on said strip material,
(C) means for stationarily registering said peripheral strip-supporting surface with said imaging means to permit said graphic intelligence to be imparted to said strip material, and
(D) means for moving said support member relative to said frame means to move said peripheral means from said imaging means to said developing means to develop said graphic intelligence.

10. An apparatus according to claim 9 wherein said apparatus includes means for supporting a receptor sheet and for bringing a said sheet and a section of the strip material into contact for the transfer of the developed graphic intelligence from a said section to a said receptor sheet.

11. An electrophotographic apparatus adapted to produce a copy of graphic intelligence, said apparatus comprising
(A) a rotatable support member,
  (1) means on said member for storing a supply roll of sensitized strip material and for rewinding exposed portions of a said strip material, and
  (2) means on said member defining an outer peripheral surface for supporting a section of said strip material and over which said strip material may pass as the same is moved between said means for storing and rewinding a said strip material,
(B) fixed imaging means for imparting photographically an image on a said section,
(C) fixed developing means for depositing a coating of a developer substance upon a said section of strip material supported adjacent the outer periphery of said support member to develop a visible pattern of such graphic intelligence on a said section, and
(D) means for moving said support member relative to said imaging means and said developing means to produce a visible pattern of such graphic intelligence on a said section of said strip material, said outer peripheral surface following a generally circular path during movement of said support member.

References Cited

UNITED STATES PATENTS

| | | | |
|---|---|---|---|
| 2,218,656 | 10/1940 | Rifer | 95—14 |
| 2,235,844 | 3/1941 | Nelson | 271—41 |
| 2,506,632 | 5/1950 | Dart | 95—14 |
| 2,552,251 | 5/1951 | Bornemann | 95—14 |
| 2,578,779 | 12/1951 | Black | 271—54 |
| 2,588,699 | 3/1952 | Carlson | 95—1.7 |
| 2,927,516 | 3/1960 | Hix | 95—1.7 |
| 2,990,278 | 6/1961 | Carlson | 96—1 |
| 3,013,878 | 12/1961 | Dessauer | 96—1 |
| 3,131,594 | 5/1964 | Benson | 88—24 |
| 3,241,957 | 3/1966 | Fauser | 96—1 |

JOHN M. HORAN, *Primary Examiner.*